July 24, 1923.

J. M. JORDAN 1,462,861

PLANT VERMIN EXTERMINATING STRUCTURE

Filed April 24, 1920    3 Sheets-Sheet 1

Inventor:
John M. Jordan,

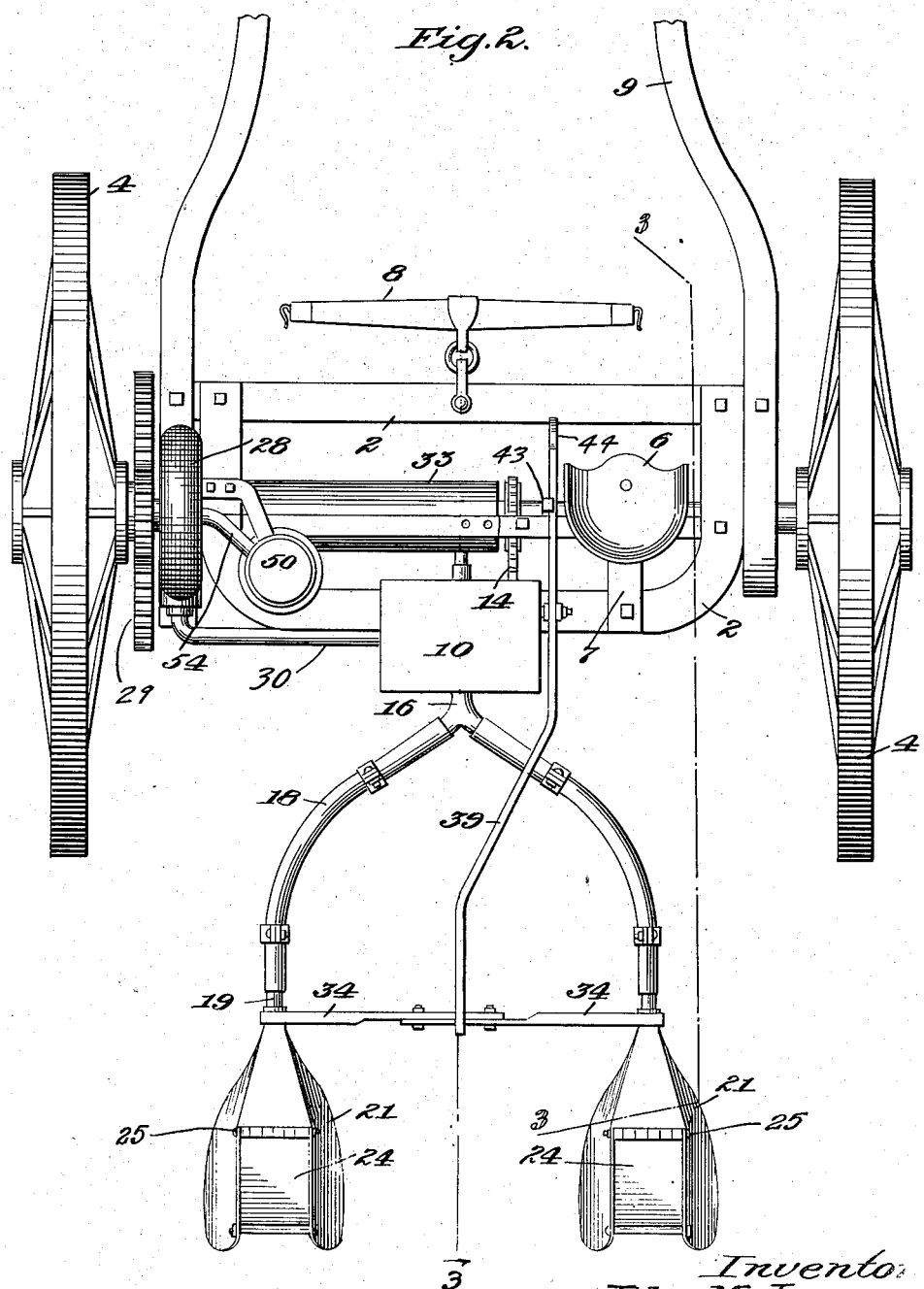

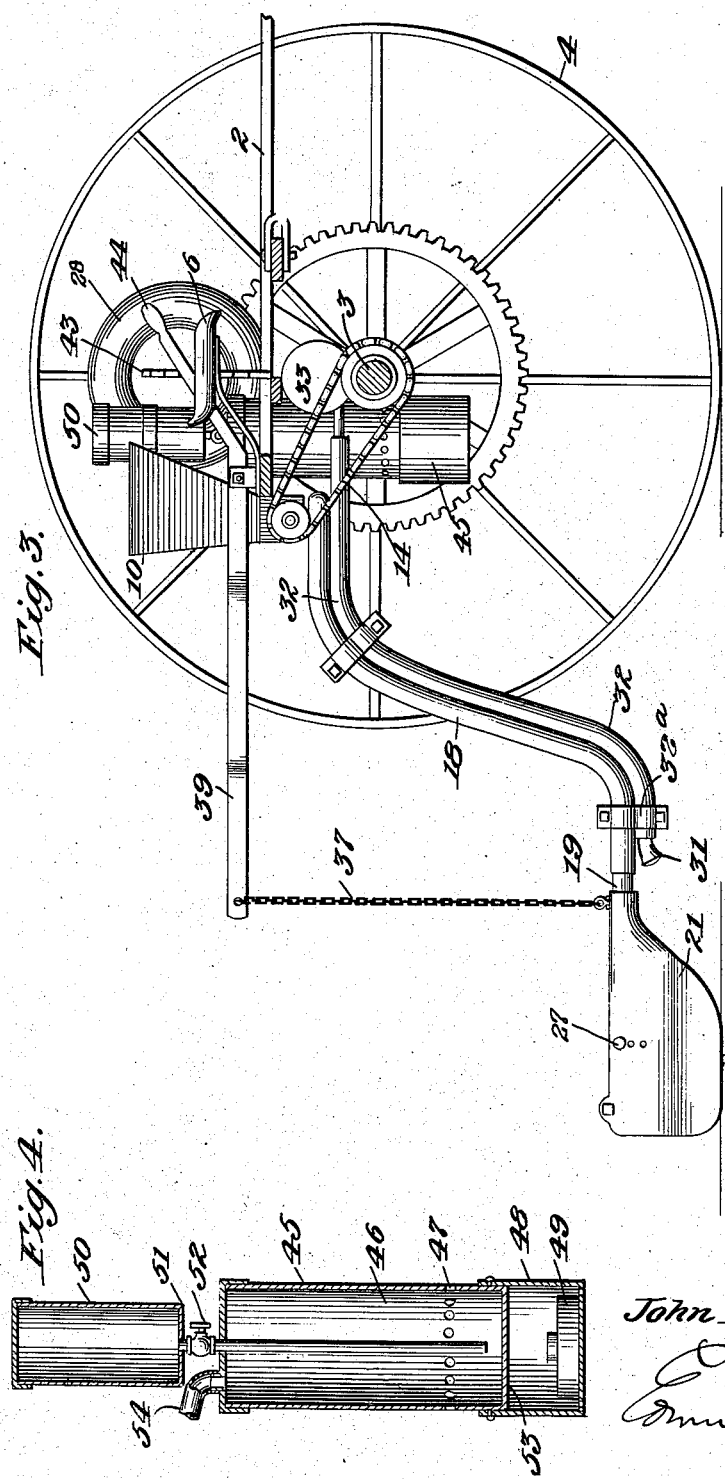

Patented July 24, 1923.

1,462,861

UNITED STATES PATENT OFFICE.

JOHN M. JORDAN, OF SUMMIT, GEORGIA; T. M. JORDAN ADMINISTRATOR OF SAID JOHN M. JORDAN, DECEASED.

PLANT-VERMIN-EXTERMINATING STRUCTURE.

Application filed April 24, 1920. Serial No. 376,387.

*To all whom it may concern:*

Be it known that I, JOHN M. JORDAN, a citizen of the United States, residing at Summit, in the county of Emanuel and State of Georgia, have invented certain new and useful Improvements in Plant-Vermin-Exterminating Structures, of which the following is a specification, reference being had therein to the accompanying drawing.

This invention relates to machines for destroying plant vermin, and has particular reference to a structure for exterminating the cotton boll weevil.

According to Bulletins published by the Bureau of Entomology, United States Department of Agriculture, and as I am aware, no really successful and practical apparatus has heretofore been devised for distributing poison upon cotton plants to effect an extermination of the weevil sufficiently to permit proper maturing of a full crop of cotton: Experiments have shown that the one basic idea of the poisoning is to keep the weevil sufficiently reduced in numbers so that their feeding will not overtake the fruit shed which would be experienced in their absence. It has also been found that the poisoning affects only the adult or beetle stage of the weevil. These experiments have also demonstrated that the most effective type of poison is calcium arsenate; that this should be preferably applied in the form of a dry powder or dust; that the most favorable time for dusting the poison is at night when the plants have been moistened by dew, and that, for the best results, it is desirable to distribute the dust directly onto the plants while the latter are in this moistened condition. By reason of inherent difficulties of attempting the poisoning operation at night and, thus, in the dark, only a relatively small area of plants can be treated within a given time, and, even then, this cannot be accomplished in anything like satisfactory manner.

It is, therefore, the primary object of my invention to provide a machine for the purpose which is comparatively light in weight, which is simple and durable, which is foolproof, and which is readily manipulated by the operator at all times. In view of the fact that the distribution of calcium arsenate is a serious, complicated and laborious operation, it is important that the apparatus employed shall be such as to effect the so-called dusting operation with a minimum loss of the poison and without danger of absorption thereof through the skin of the operator.

Another object of the invention is to provide means whereby the plants may be properly moistened preliminary to the distribution thereon of the calcium arsenate or other poison which may be employed, and by the provision of which means the structure may be effectually employed in the day time and obviate the necessity of dusting the plants at night, as is now quite the general practice.

Still another object within the contemplation of the invention is the provision of effective means for covering or inclosing the plants temporarily and while the poison is being distributed thereon, whereby the poisonous fumes or dust may be effectually brought into direct contact with the plants with little or no escape or loss of the dust or fumes.

A still further object of the invention is to provide means, associated with a suitable distributing mechanism, whereby a cloud or vapor of poison may be generated for application to the plant being treated.

Still another object of the invention is to associate, in an operative manner, a pressure-producing medium for the purpose of drawing the fumes or dust from a generator and then feeding it to the distributing means.

Some of the minor objects of the invention involve the provision of a plurality of dust or fume-conveying or discharging instrumentalities whereby a plurality of rows or plants may be simultaneously treated; there being means provided for regulating both the vertical and lateral adjustment of the distributing portions of the structure so that these may be accommodated to varying widths and spacing of the rows.

The invention has other objects in view, and possesses advantages over existing structures, all as will be more fully hereinafter explained in the following specification:

In order that the invention may be more readily comprehended, I have disclosed a practical embodiment thereof in the accompanying drawings; but, inasmuch as these are intended to be merely illustrative, it is to be understood that the invention is susceptible of a wide range of variation and modification without departing from its spirit or sacrificing any of its salient features or underlying principles.

In these drawings:

Fig. 2 is a view in top plan thereof;

Fig. 3 is a view in vertical section, on the line 3—3, Fig. 2, the single tree having been omitted;

Fig. 4 is a detailed view, in vertical section, of a type of generator which I prefer to employ;

Figure 1:
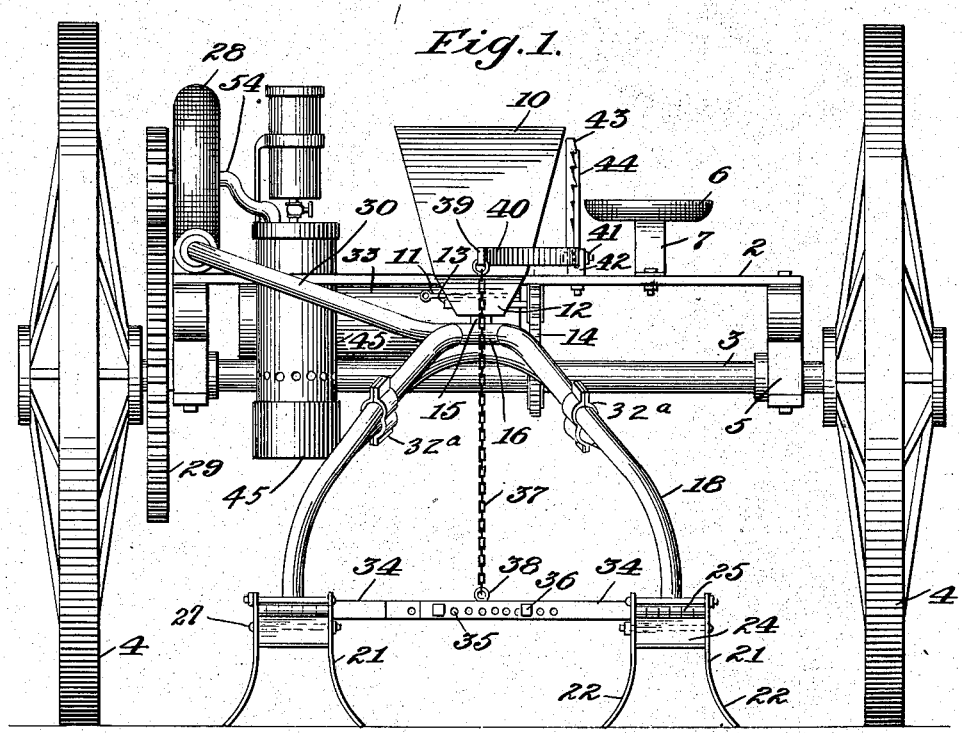
Fig. 1 is a view in rear elevation of a two-wheeled structure built in accordance with a preferred embodiment of my invention.
Figure 5:
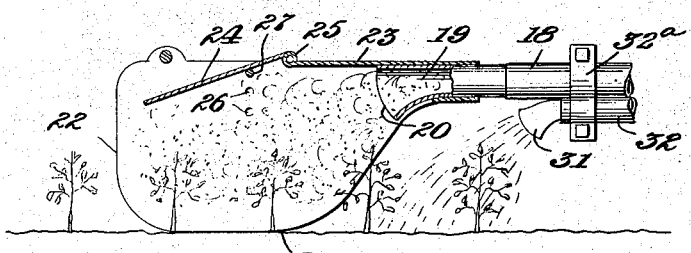
Fig. 5 is a similar view of a plant-covering hood carried by the wheeled-structure whereby the plants may be temporarily inclosed while being treated.
Figure 6:
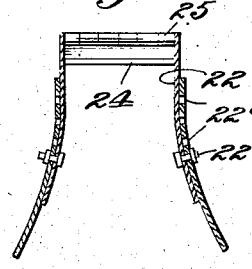
Fig. 6 is a view in cross section of a modified form of side portion with means for increasing the height of the plant-covering hood.

In these drawings, the reference-numeral 1 designates, generally, a so-called wheel-construction or sulky comprising a frame 2 which is supported on an axle 3 carrying traction wheels 4. The wheels are fast to the axle 3 and the latter rotates in bearings 5 carried by the frame 2. The frame, axle and wheels may be of any required form and dimensions; but the relative arrangement of these is such as to provide, so far as is practical, a balanced structure. To this end, also, the driver's seat 6 is supported on a seat-bracket 7 on the rear portion of the frame.

The draft animal is preferably hitched to the singletree 8 between the shafts 9, it being desirable to utilize but one animal in connection with a machine of this type, though it is to be understood that I may, if desired, use more than one draft animal and especially if the weight of the structure, with the various components which comprise it, necessitates this. In any event, the draft animal should be hitched sufficiently in advance of the distributing components of the machine that it will be unaffected by the poisonous dust or fumes being discharged from the rear by the machine. Likewise, the driver is always in advance of the point of distribution or discharge of the poisonous dust or fumes so that he is unaffected thereby.

Suitably supported on the frame 2 is a dust container or hopper 10 of appropriate form and dimensions and provided with means, such as a slide-valve or gate 11, for controlling the discharge of its contents from the reduced lower portion 12. Operating in the portion 12 is an agitator 13 driven by a sprocket-chain 14 that is operated by the axle 3. The agitator 13 also functions to feed the powder from the hopper into the distributing components of the machine; and, to this end, a tubular connection 15 communicates with a Y-member 16, which may be suitably secured to the frame 2.

Extending from the Y-member 16 are flexible tubular elements or pipes 18 terminating in discharge-nozzles 19, the extremity of the nozzles being flared to provide a discharge-mouth 20.

Secured to the nozzles 19 and housing the discharge-mouth 20 is a hood or covering 21, this including two side-portions 22, a stationary top-portion 23, and a movable top-element 24 hinged (as at 25) to the stationary top-portion 23. The side-portions 22 are provided with a series of apertures 26 adapted to receive a pin or similar instrumentality 27 for holding the movable top-element 24 at different relative angles in respect to the stationary top-portion 23. This hood constitutes a plant-covering inclosure or device whereby a plant may be encompassed during the application of the poison introduced into the hood in a manner hereinafter described. The hinged top-member has a limited movement and is more or less controlled in its position by the top of the plant. To cover plants of considerable height, I may add side-wings or extensions 22ª, these being suitably secured, as by bolts 22ᵇ, to the side portions 22.

Inasmuch as the poison material contained in the hopper 10 must be discharged—through the Y-member 16, the pipes 18, the nozzle 19, and onto the plants inclosed by the hood 21—by considerable force, a suitable pressure-producing device is preferably employed; and, in the present instance, this device includes a fan device 28 suitably mounted upon the frame 2 adjacent one of the traction wheels 4 and adapted to be driven by a gear 29 operated by the shaft 3. Extending from the fan 28 is a pipe 30 leading into the Y-member 16 so that the pressure medium, introduced by the fan, may be discharged into the Y-member and press the contents thereof as received from the hopper 10 through the pipes 18 out through the nozzles 19 into the hood 21 and onto the plants inclosed thereby. In this connection, it is to be noted that the dust material from the hopper 10 is discharged, by a blower action, through the distributing components of the machine, in contradistinction from being moved, as by suction, from the hopper.

In order to moisten the plants preliminary to their being dusted with the calcium arsenate, I preferably provide means for spraying or otherwise applying moisture thereto; and, to this end, arrange a spray or other form of nozzle 31 at a point in advance of the hood 21. A convenient means of supplying the nozzle 31 is a flexible pipe 32, secured, as by clips 32ª, to the tubes 18. The pipe 32 extends forwardly and upwardly from the nozzle 31 and, by any suitable means, may be connected to a water tank 33 appropriately mounted on or carried by the frame 2, and in which a suitable fluid, such as water, or a fluid poison, may be carried, and from which, as by pressure, the same may be forced into the tube 32 and out through the spraying nozzle 31. By this means, as the machine travels along a row of plants, each plant is suitably moistened, as by being sprayed with the fluid of the tank 33, in advance of being inclosed by the hood 21 for the application of the dusting powder thereto as discharged from the hopper 10.

In usual practice, the cotton plants are arranged in rows spaced apart approximately four feet; but as the spacing may vary, I provide means for adjusting the hoods 21 relatively to each other; that is, laterally: These means include a connecting bar or arm 34 extending from the inner side of the hood and provided with a series of bolt-holes 35. Bolts or similar fastening devices 36 secure the two arms 34 together and permit the same to be elongated or laterally adjusted so as to space the hoods nearer to or farther away from each other, as may be required.

In practice, the hoods 21 are arranged to rest laterally upon the ground and be dragged along the surface; but at times it is desirable to adjust them vertically, and to this end a chain or similar instrumentality 37 is connected, at its lower end, to an I-bolt 38 attached to one of the arms 34, and to a rearwardly-extending arm 39 carried by a lateral arm 40 which is pivoted, as at 41, to a post 42, and with which is associated an upstanding rack 43 adapted to be engaged by a lever 44. As will be understood, the operation of the lever 44 in respect to the rack 43 will operate the cross-arm 40 and elevate or depress the arm 39 to raise or lower the hoods 21, as occasion may require.

Either in lieu of applying the poison dust or in conjunction therewith, I may treat the plants with a gaseous fume by certain of the components already described, that is: Operatively associated with and connected to the fan device 28 is a fume generator 45, shown in detail in Fig. 4, and comprising a cylindrical housing 46, perforated (as at 47), and to which is attached a heater support 48 in which a lamp or other heat-generating device 49 is sustained. Disposed above, but in communication with, the housing 46 is a fume material container 50, from which extends a pipe 51 controlled by a valve 52 and by which any suitable chemical may be conveyed from the container 50 into the housing 46 and there be rendered into a fume by dripping onto the bottom 53 of the housing 46, the bottom being heated by the lamp 49. Extending from the housing 46 is a pipe 54 which leads into the fan 28, and by this arrangement a suction action, effected by the fan 28, draws the fumes from the housing 46, first into the fan and then forced thereby into the pipe 30 and thence through the Y-member 16 and the pipes 18, through the nozzles 19 and into the hoods 21. It is to be understood that the fumes may be discharged upon the plants simultaneously with the application thereto of the dust from the hopper 10.

From the foregoing, it will be observed that I have provided an effective machine for applying a poison, such as calcium arsenate, in dry or dust form upon a single, or two or more rows of cotton plants simultaneously; and either in conjunction therewith or independently thereof to apply a fume to the plants, both the dust and the fume being delivered to the hoods 21 under more or less pressure induced by the fan device 28; that the application of these poisons to the plants may be accomplished at any time in the day by reason of the fact that the plants may be preliminarily moistened by the machine preparatory to the application thereto of the dusting powder or poisonous fume; that the poison dust is effectually discharged from the hopper 10 by feeding mechanism that operates also to agitate the dust and, thus, to maintain it in powdered form should it have become lumped; that the powder or fumes may be delivered to the plants at any particular elevation; that, during the application of the dust or fumes, the plants are effectually inclosed to prevent escape of the poison into the atmosphere that would result in loss thereof and also in injury to the driver and to the draft animal; that all of the various components of the apparatus are operated to effect a continuous movement of the poison—whether it be the poison dust or the fumes—by the travel of the traction wheels so that the movement of the poison is always in proper proportion to the speed of the travelling structure; and, furthermore, that by the relative arrangement of the components in respect to the axle, the entire structure is properly balanced.

While I have herein specified calcium arsenate as the poison which can be applied by this apparatus to the cotton plants; nevertheless it is to be understood that any other appropriate kind of poison or material, such as Paris green, may be applied by this apparatus to cotton or other types of plants.

A feature of importance in my structure resides in the fact that the discharge of the poison is considerably to the rear of the position which the driver occupies upon the frame and also the draft animal; in consequence of which the operation of treating plants is effected under the most favorable conditions, as distinguished from those which have heretofore prevailed where other types of apparatus are employed.

In addition to the fact that the machine, herein disclosed, provides an effective means for applying poison to plants, it is, relatively speaking, a very simple construction, and by reason of this fact can be manufactured and exploited at small expense.

What I claim is:

A vermin-destroying structure including a wheel-supported sulky comprising a frame, an axle mounted in the frame, wheels attached to the axle, gearing associated with the axle, a fan device carried by the frame, a poison-containing hopper also carried by the frame, a distributing member associated with the hopper and communicating with the fan device, tubular elements extending from the distributing device, yieldable plant-covering hoods attached to the tubular members and arranged in spaced-apart relation, means for adjusting the hoods laterally, and means for raising and lowering the hoods to different planes in respect to the frame of the sulky.

In testimony whereof I affix my signature in presence of two witnesses.

JOHN M. JORDAN.

Witnesses:
ULRIE T. MENGERT,
S. E. GLADDING.